(12) United States Patent
Suzuki et al.

(10) Patent No.: US 9,492,889 B2
(45) Date of Patent: Nov. 15, 2016

(54) LASER PROCESSING MACHINE

(75) Inventors: Masami Suzuki, Kyoto (JP); Norio Nishi, Kyoto (JP);
(Continued)

(73) Assignee: KATAOKA CORPORATION, Kyoto-Shi, Kyoto (JP)

( * ) Notice: Subject to any disclaimer, the term of this patent is extended or adjusted under 35 U.S.C. 154(b) by 799 days.

(21) Appl. No.: 13/814,227

(22) PCT Filed: Jul. 26, 2012

(86) PCT No.: PCT/JP2012/068979
§ 371 (c)(1),
(2), (4) Date: Feb. 4, 2013

(87) PCT Pub. No.: WO2013/057998
PCT Pub. Date: Apr. 25, 2013

(65) Prior Publication Data
US 2013/0186871 A1    Jul. 25, 2013

(30) Foreign Application Priority Data
Oct. 21, 2011    (JP) ................. 2011-232180

(51) Int. Cl.
*B23K 26/02*    (2014.01)
*B23K 26/04*    (2014.01)
(Continued)

(52) U.S. Cl.
CPC ............. *B23K 26/04* (2013.01); *B23K 26/032* (2013.01); *B23K 26/042* (2015.10);
(Continued)

(58) Field of Classification Search
CPC .................. B23K 26/04; B23K 26/067; B23K 26/041; B23K 26/0807; B23K
(Continued)

(56) References Cited

U.S. PATENT DOCUMENTS 4,769,523 A    9/1988  Tanimoto et al.
4,918,284 A *  4/1990  Weisz .................. B23K 26/041
                                                            219/121.69
(Continued)

FOREIGN PATENT DOCUMENTS

JP    2002-542042 A    12/2002
JP    2008-068270 A     3/2008
(Continued)

OTHER PUBLICATIONS

Korean Office Action dated Mar. 10, 2014.
(Continued)

*Primary Examiner* — Thien S Tran
(74) *Attorney, Agent, or Firm* — McGinn IP Law Group, PLLC

(57) ABSTRACT

A processing machine includes mirrors and to reflect a beam L oscillated from a laser oscillator to a predetermined surface on which a workpiece is arranged, optical axis operating mechanisms and to position an optical axis of the beam L at a desired target irradiation position by changing directions of the mirrors and, a camera sensor to capture an image of the target irradiation position and its periphery reflected in the mirror, and an error calibration mechanism to detect an error between the target irradiation position instructed to the optical axis operating mechanisms and an actual position of the optical axis of the beam L in the predetermined surface by referring to the image captured by the camera sensor. A correction amount to the optical axis operating mechanisms and is determined based on the error to irradiate the target irradiation position with the beam L during processing.

19 Claims, 8 Drawing Sheets

(75) Inventors: Junichi Matsumoto, Kyoto (JP);
Nobutaka Yoneyama, Kyoto (JP);
Satoshi Tokuoka, Kyoto (JP); Etsushi Kato, Kyoto (JP)

(51) Int. Cl.
*B23K 26/067* (2006.01)
*B23K 26/03* (2006.01)
*B23K 26/06* (2014.01)
*B23K 26/08* (2014.01)

(52) U.S. Cl.
CPC ......... *B23K 26/067* (2013.01); *B23K 26/0643* (2013.01); *B23K 26/0665* (2013.01); *B23K 26/082* (2015.10); *B23K 26/0853* (2013.01)

(58) Field of Classification Search
CPC ................. 26/0643;B23K 26/0665; B23K 26/0853; B23K 26/032
USPC ............. 219/121.6, 121.63, 121.64, 121.68, 219/121.69, 121.71, 121.77, 121.78, 121.83
See application file for complete search history.

(56) References Cited

U.S. PATENT DOCUMENTS

| | | | |
|---|---|---|---|
| 6,501,061 B1 | 12/2002 | Kitai et al. | |
| 6,621,060 B1 * | 9/2003 | Nantel | B23K 26/04 250/201.4 |
| 2003/0002055 A1 * | 1/2003 | Kilthau | B23K 26/02 356/614 |
| 2007/0114700 A1 | 5/2007 | Andrewlavage, Jr. et al. | |
| 2008/0061042 A1 | 3/2008 | Nomaru | |
| 2009/0315222 A1 | 12/2009 | Andrewlavage, Jr. et al. | |
| 2009/0321399 A1 | 12/2009 | Inagawa et al. | |
| 2010/0039680 A1 | 2/2010 | Yoon et al. | |

FOREIGN PATENT DOCUMENTS

| | | |
|---|---|---|
| JP | 2008-238229 A | 10/2008 |
| JP | 2009-006339 A | 1/2009 |
| JP | 2009-516586 A | 4/2009 |
| JP | 2009-297726 A | 12/2009 |
| JP | 2011-031248 A | 2/2011 |
| KR | 10-2010-0044133 A | 4/2010 |
| WO | WO 2010/005394 A1 | 1/2010 |

OTHER PUBLICATIONS

European Search Report dated Jul. 14, 2015.
International Search Report in PCT/JP2012/068979 dated Oct. 16, 2012.

* cited by examiner

LASER PROCESSING MACHINE

TECHNICAL FIELD

The present invention relates to a laser processing machine that applies processing by irradiating a freely-selected position of a workpiece with a laser beam.

BACKGROUND ART

Some types of processing machines that irradiate a freely-selected position of a workpiece with a laser beam displace an optical axis of the laser beam. As a concrete measure to change a direction of the optical axis, a combination of a galvano scanner and a condensing lens is often employed (refer to, for example, the following patent documents).

In a scan with the optical axis of the laser beam being displaced, errors in a plane coordinate system are caused due to reasons including a rotational positioning error of a mirror of the galvano scanner, optical distortion of the condensing lens, and the like. It is necessary to remove such errors in advance before performing laser processing.

Previously, a test piece is subjected to the laser processing for a test pattern, and thereafter, an error between the test pattern and an actually-formed pattern is measured by examining the test pattern by a microscope, and a correction amount to reduce the error is added to an instruction value to the galvano scanner and the like.

However, it is very time consuming to examine the pattern formed on the test piece using the microscope, and it is also necessary to provide the microscope with high precision at a workplace since such correction operation is always performed in adjusting the processing machine at the time of assembly and delivery. Moreover, the correction operation is also required at the time of optically adjusting a laser oscillator, exchanging or changing a focal point of the condensing lens, which are troublesome.

CITATION LIST

Patent Documents

Patent document 1: Japanese Unexamined Patent Application Publication No. 2008-068270
Patent document 2: Japanese Unexamined Patent Application Publication No. 2009-297726

SUMMARY OF INVENTION

Technical Problem

An intended object of the present invention is to provide a laser processing machine capable of calibrating an error in an irradiation position of a laser beam with ease.

Solution to Problem

A laser processing machine according to the present invention is to apply processing by irradiating a workpiece with a laser beam, and includes a mirror to reflect the laser beam oscillated from a laser oscillator to a predetermined surface on which the workpiece is arranged, an optical axis operating mechanism to position an optical axis of the laser beam at a desired target irradiation position in the predetermined surface by changing a direction of the mirror, a camera sensor to capture an image of the target irradiation position and its periphery in the predetermined surface reflected in the mirror, and an error calibration mechanism to detect an error between the target irradiation position instructed to the optical axis operating mechanism and an actual position of the optical axis of the laser beam in the predetermined surface, by referring to the image captured by the camera sensor. A correction amount to be instructed to the optical axis operating mechanism can be determined based on the error in order to irradiate the target irradiation position with the laser beam during processing.

Further, a laser processing machine according to the present invention is to apply processing by irradiating a workpiece with a laser beam, and includes a mirror to reflect the laser beam oscillated from a laser oscillator to a predetermined surface on which the workpiece is arranged, an optical axis operating mechanism to position an optical axis of the laser beam at a desired target irradiation position in the predetermined surface by changing a direction of the mirror, a camera sensor to capture an image of the target irradiation position and its periphery in the predetermined surface, and a light spot of the laser beam irradiating on the predetermined surface, and an error calibration mechanism to detect an error between the target irradiation position instructed to the optical axis operating mechanism and an actual position of the optical axis of the laser beam in the predetermined surface, by referring to the image captured by the camera sensor. The correction amount to be instructed to the optical axis operating mechanism can be determined based on the error in order to irradiate the target irradiation position with the laser beam during processing.

If a beam splitter is arranged on an optical path between the laser oscillator and the mirror, and the image of the target irradiation position and its periphery in the predetermined surface is captured by the camera sensor via the mirror and the beam splitter, an optical axis of the camera sensor and the optical axis of the laser beam can be brought as close to each other as possible, and superimposed on each other. Also, degree of freedom increases in planning where to arrange the camera sensor.

If the camera sensor captures an image of a grid pattern provided on the predetermined surface and indicating position coordinates of respective positions in the predetermined surface, and the error calibration mechanism detects the error with reference to the grid pattern appeared in the captured image, it is possible to accurately detect the error between the target irradiation position and the position of the optical axis of the actually projected laser beam in the predetermined surface.

In detail, the error calibration mechanism includes an irradiation position instruction unit to give an instruction to the optical axis operating mechanism so as to position the optical axis of the laser beam at the target irradiation position in the predetermined surface, an error detection unit to calculate the error between the target irradiation position and the actual position of the optical axis of the laser beam in the predetermined surface by referring to the image captured by the camera sensor, and a correction amount storage unit to determine and store the correction amount to be instructed to the optical axis operating mechanism based on the error calculated in the error detection unit in order to irradiate the target irradiation position during processing.

Advantageous Effects of Invention

According to the present invention, it is possible to realize a laser processing machine capable of calibrating an error in an irradiation position of a laser beam with ease.

DESCRIPTION OF EMBODIMENTS

Figure 1:
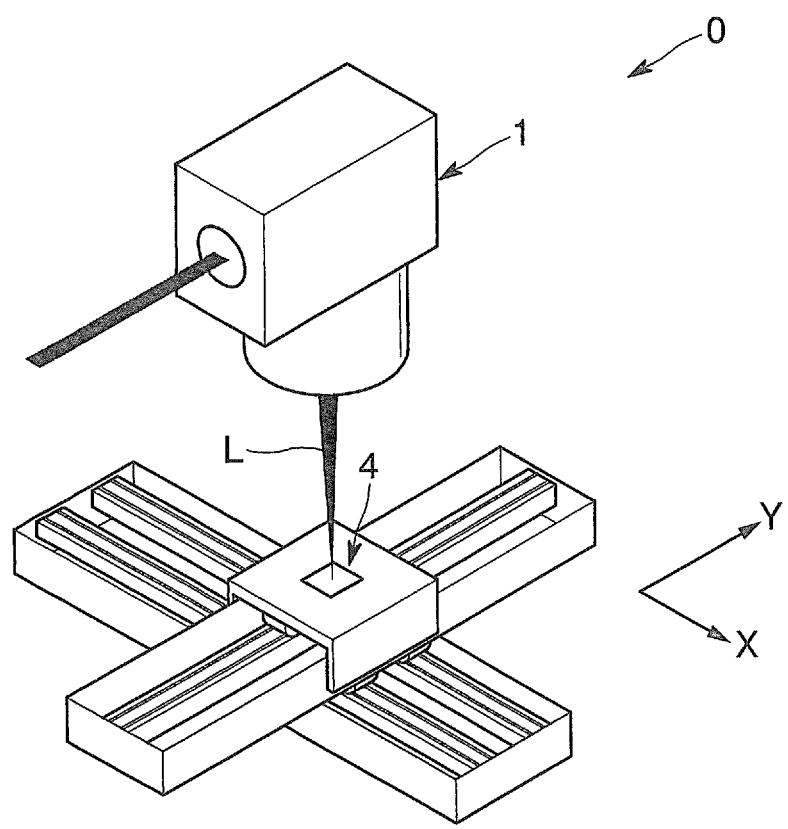
FIG. 1 is a perspective view showing a laser processing machine according to an embodiment of the present invention.
Figure 2:
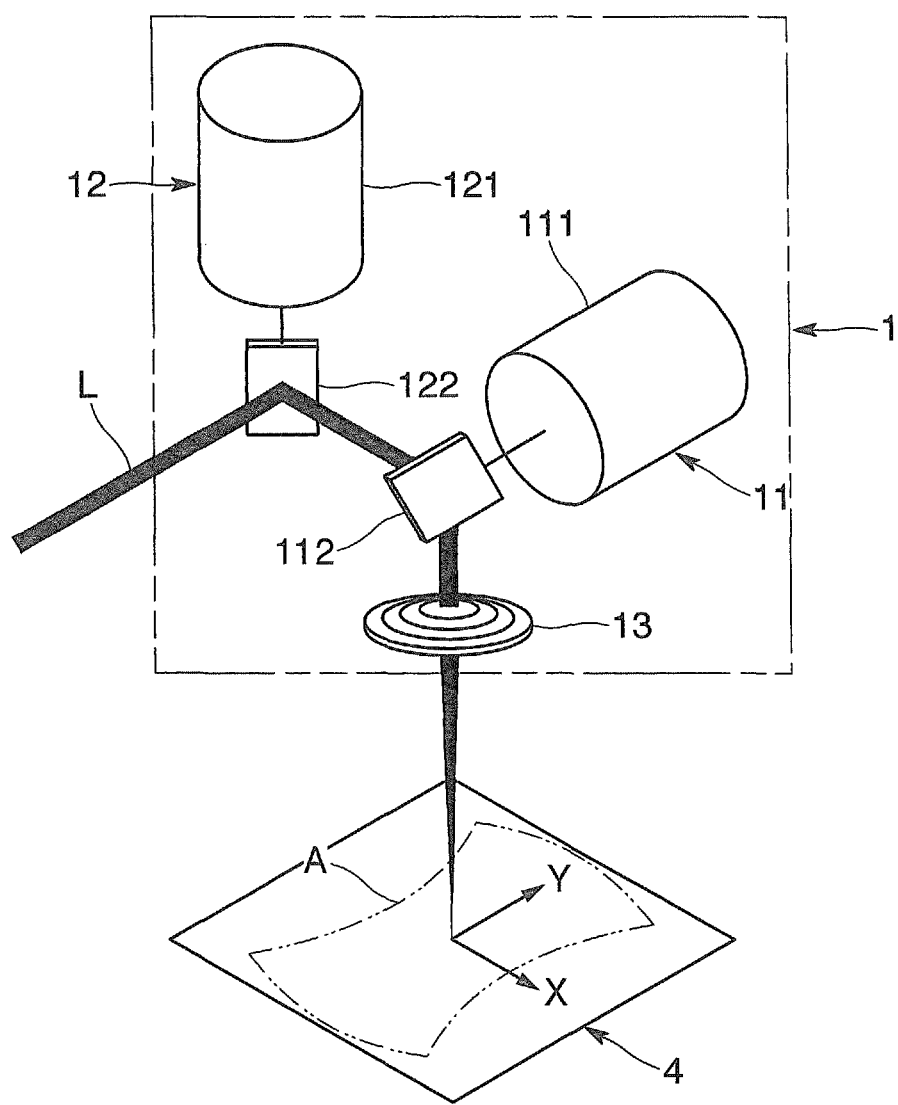
FIG. 2 is a perspective view showing a laser irradiation device of the laser processing machine.

An embodiment of the present invention will be explained with reference to the drawings. As shown in FIG. 1 and FIG. 2, a laser processing machine 0 of this embodiment includes a mount 4 that supports a workpiece to be processed, and a laser irradiation device 1 that irradiates the workpiece with a laser beam L, and applies laser processing to a freely-selected position of the workpiece.

Figure 6:
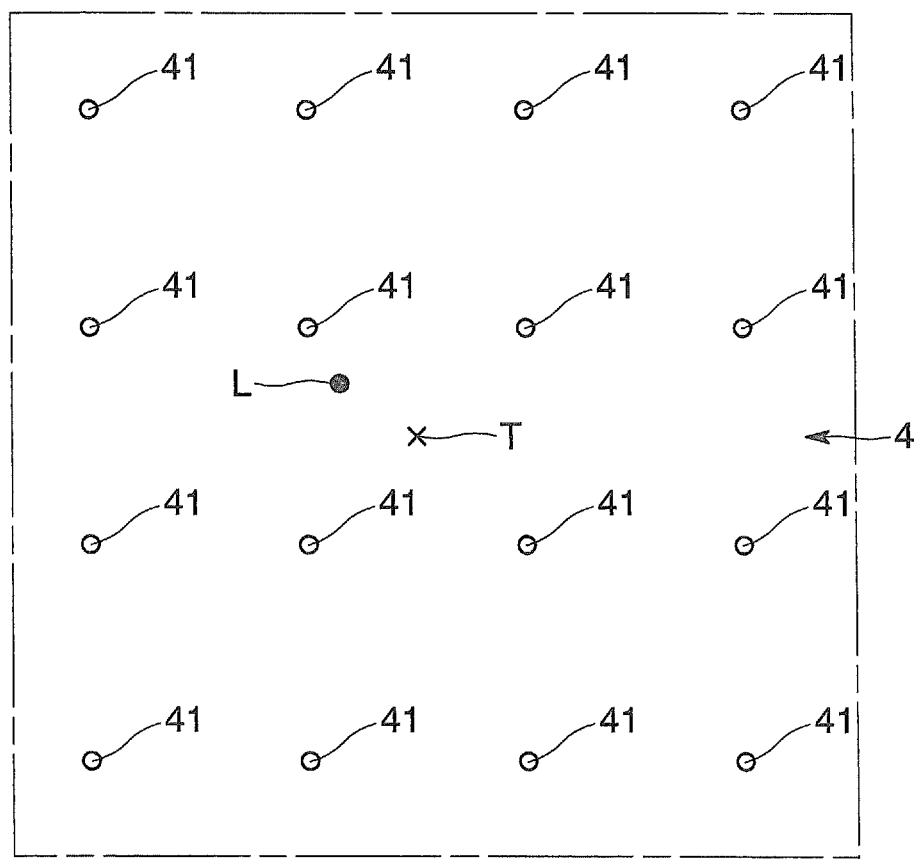
FIG. 6 is a plan view showing a method of the error calibration by the laser processing machine.

The mount 4 supports the workpiece at the time of the laser processing. A top surface of the mount 4 that serves as a predetermined surface on which the workpiece is arranged has a grid pattern indicating position coordinates of respective positions on the surface. Although the form of the grid pattern is not particularly limited, FIG. 6 shows an example in which innumerable points (circles each having a diameter of 0.5 mm, for example) 41 are provided at predetermined intervals (1 mm intervals, for example) in an X-axis direction and a Y-axis direction that is perpendicular to the X-axis. Other aspects of the grid pattern may include a lattice or the like that is provided on the top surface of the mount 4.

The mount 4 may be immovable with respect to the laser irradiation device 1, or may be relatively displaceable with respect to the laser irradiation device 1 in the X-axis direction and/or the Y-axis direction. The latter case may take the form in which the mount 4 is supported by an XY stage. During calibration, however, the mount 4 is fixed to a predetermined reference position. Displacement of the mount 4 is not made during the calibration.

As shown in FIG. 2, the laser irradiation device 1 includes a laser oscillator (not shown), galvano scanners 11 and 12 that scan a laser beam L oscillated from the laser oscillator, and a condensing lens 13 that condenses the laser beam L.

The galvano scanners 11 and 12 rotate mirrors 112 and 122 that reflect the laser beam L by servomotors, stepping motors and the like that serve as optical axis operating mechanisms 111 and 121. When directions of the mirrors 112 and 122 are changed, an optical axis of the beam L can be displaced. Both of an X-axis galvano scanner 11 that changes the optical axis of the beam L in the X-axis direction and a Y-axis galvano scanner 12 that changes the optical axis of the beam L in the Y-axis direction are provided according to this embodiment, and hence the irradiation position of the beam L on the top surface of the mount 4 can be controlled two-dimensionally, that is, in the X-axis direction and the Y-axis direction.

The condensing lens 13 may be, for example, an Fθ lens.

The irradiation position of the laser beam L on the top surface of the mount 4 is affected by a rotational positioning error of the galvano scanners 11 and 12. In addition, optical distortion of the condensing lens 13 is also caused. An error in the irradiation position of the laser beam L tends to increase as a distance from the center of a scanning region of the galvano scanners 11 and 12 increases. This is schematically illustrated with an alphabet A in FIG. 2.

Figure 3:
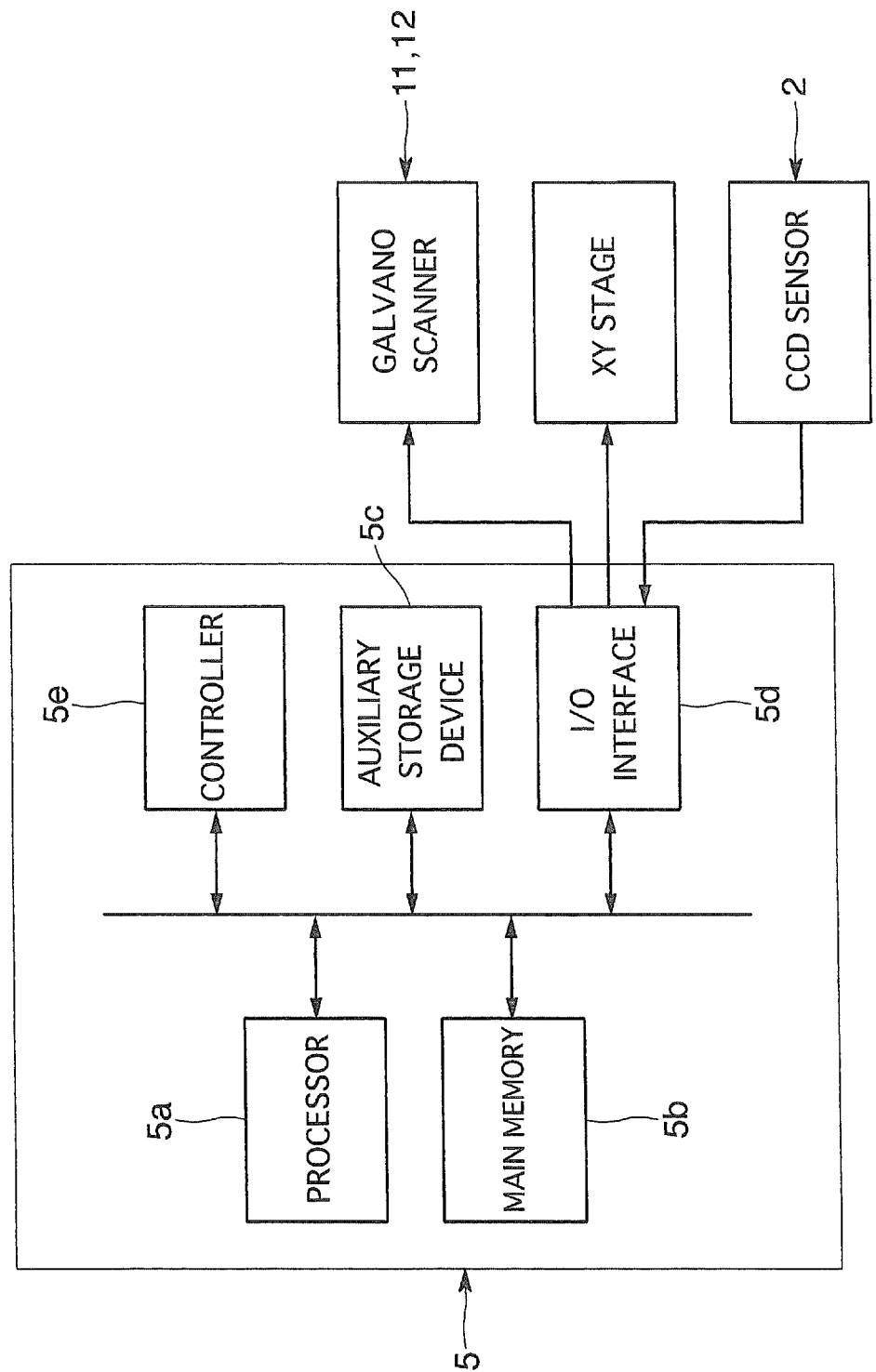
FIG. 3 is a view showing a structure of hardware resources of the laser processing machine.

A control device 5 that controls the galvano scanners 11 and 12 and serves as an error calibration mechanism includes a processor 5a, main memory 5b, an auxiliary storage device 5c, an I/O interface 5d and the like as shown in FIG. 3, which are controlled by a controller 5e (a system controller, an I/O controller and the like) to operate in combination. The auxiliary storage device 5c may be a flash memory, a hard disk drive and the like. The I/O interface 5d may include a servo driver (servo controller).

Figure 4:
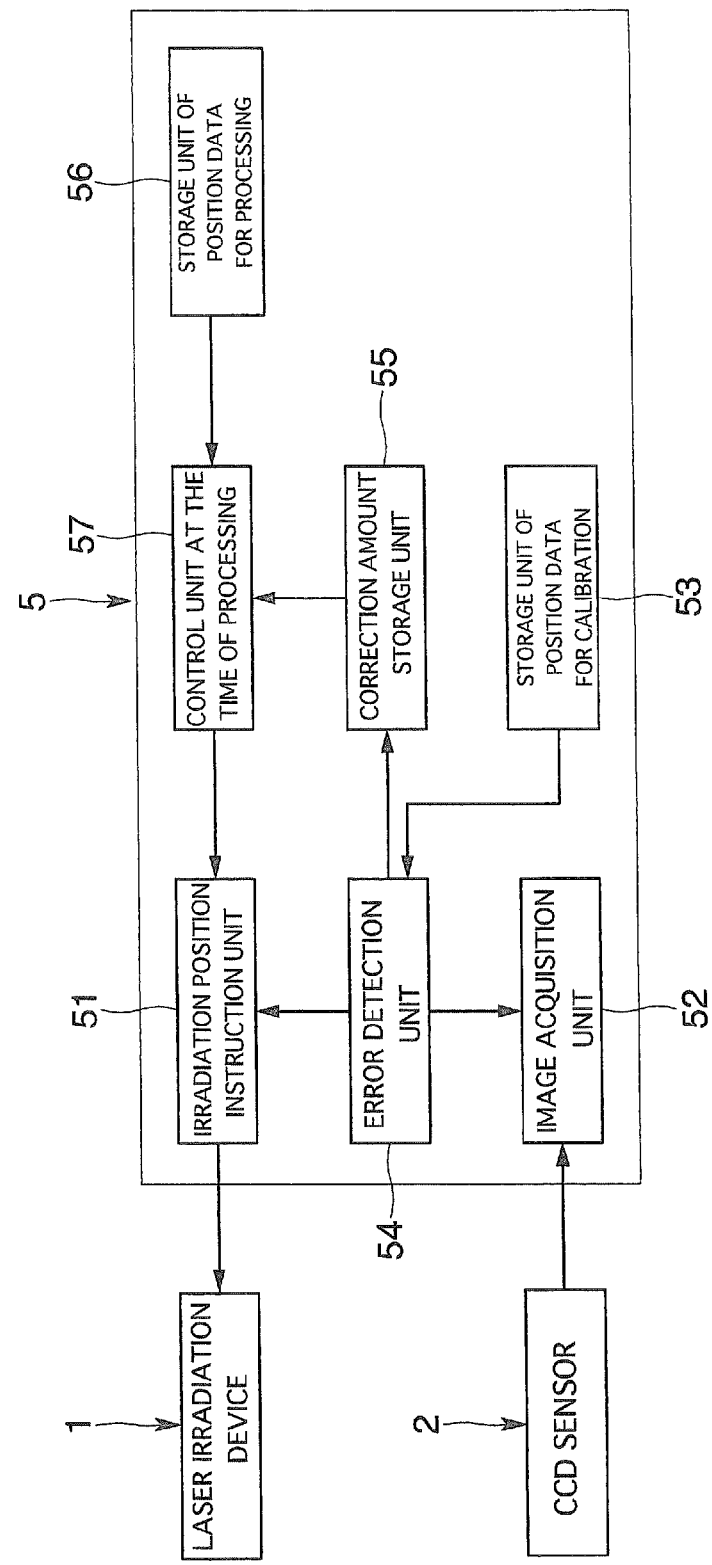
FIG. 4 is a functional block diagram of the laser processing machine.

A program to be executed by the control device 5 is stored in the auxiliary storage device 5c and when the program is executed, it is read into the main memory 5b and decoded by the processor 5a. Then, according to the program, the control device 5 functions as an irradiation position instruction unit 51, an image acquisition unit 52, a storage unit of position data for calibration 53, an error detection unit 54, a correction amount storage unit 55, a storage unit of position data for processing 56, and a control unit at the time of processing 57, as shown in FIG. 4.

The irradiation position instruction unit 51 gives an instruction to the laser irradiation device 1 so as to irradiate a target irradiation position with the laser beam L. In order to irradiate (x, y) coordinates of the target irradiation position on the top surface of the mount 4 with the laser beam L, the irradiation position instruction unit 51 inputs a control signal corresponding to the coordinates to the galvano scanners 11 and 12 to control angles of the mirrors 112 and 122.

The image acquisition unit 52 receives and acquires an image captured by a camera sensor 2, and temporarily stores the image in a necessary storage area in the main memory 5b or the auxiliary storage device 5c. The camera sensor 2 captures an image of the target irradiation position and its periphery on the top surface of the mount 4, and/or a light spot of the laser beam L that is actually projected on the top surface of the mount 4. An arrangement of the camera sensor 2 will be described later.

The storage unit of position data for calibration 53 stores position data for calibration. In calibrating the irradiation position of the laser beam L, the laser beam L is projected to a plurality of points in an XY plane coordinate system on the top surface of the mount 4, errors in the irradiation positions at the respective points are detected, and correction amounts at the respective points are determined. According to this embodiment, the detection of the errors and the determination of the correction amounts are made for 6,000 to 7,000 points scattered over the top surface of the mount 4, and the (x, y) coordinates of the 6,000 to 7,000 points are respectively stored as the position data for calibration.

The error detection unit 54 acquires the error between the target irradiation position and the actual irradiation position of the laser beam L. The error detection unit 54 reads out the position data for calibration to obtain the (x, y) coordinates of the target irradiation position of the laser beam L, and inputs the control signal corresponding to target coordinates to the galvano scanners 11 and 12 via the irradiation position instruction unit 51. Referring to the image acquired by the image acquisition unit 52, the error detection unit 54 calculates differences in the X-axis direction and the Y-axis direction ($\Delta x$, $\Delta y$) between the coordinates of the position data for calibration, that is, target irradiation position coordinates T ($x_T$, $y_T$) that are instructed to the galvano scanners 11 and 12, and coordinates of an actual irradiation position L ($x_L$, $y_L$) when the laser beam L is projected targeting the coordinates, as shown in FIG. 6.

Based on the error between the target irradiation position and the actual irradiation position of the laser beam L, the correction amount storage unit 55 determines and stores the correction amounts to be instructed to the laser irradiation device 1 in order to irradiate the target irradiation position at the time of the processing. Specifically, the target irradiation position coordinates ($x_T$, $y_T$), the X-axis direction error $\Delta x$, and the Y-axis direction error $\Delta y$ are substituted into a predetermined function formula to compute an X-axis direction correction amount and a Y-axis direction correction amount to be given to the galvano scanners 11 and 12 as the control signal. The correction amounts are associated with the above-described target coordinates ($x_T$, $y_T$) and stored in the main memory 5b or the auxiliary storage device 5c.

The storage unit of position data for processing 56 stores the position data for processing. The storage unit of position data for processing 56 stores, as the position data for processing, CAD data or the like that defines the position in the workpiece to be irradiated with the laser beam L, or the (x, y) coordinates of the plurality of points to be irradiated with the laser beam L at the time of the processing.

The control unit at the time of processing 57 controls the laser irradiation device 1 so that the irradiation position defined by the above-described position data for processing is irradiated with the laser beam L. The control unit at the time of processing 57 reads out the position data for processing to obtain the (x, y) coordinates of the target irradiation position of the laser beam L, and reads out the correction amounts associated with the target coordinates. When the correction amounts directly associated with the target coordinates are not stored in the correction amount storage unit 55, the control unit at the time of processing 57 reads out a plurality of correction amounts associated with a plurality of coordinates that are close to the target coordinates, and calculates appropriate correction amounts by interpolation between them. Then, it inputs the control signal that corresponds to the coordinates, obtained by adding the correction amounts to the target coordinates, to the galvano scanners 11 and 12 via the irradiation position instruction unit 51. As a result of this, the original target irradiation position is properly irradiated with the laser beam L.

Figure 5:
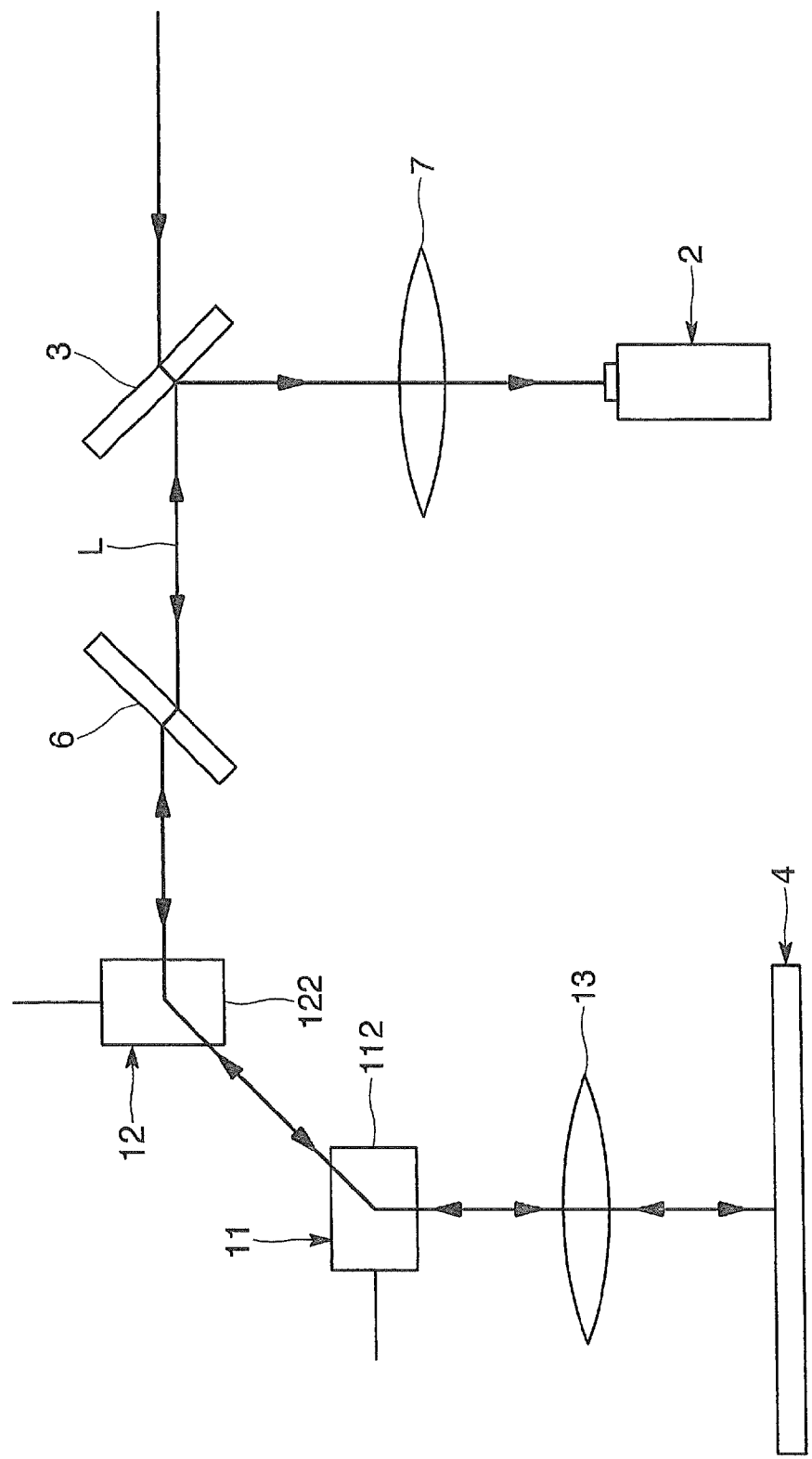
FIG. 5 is a view schematically showing a structure of the laser processing machine at the time of error calibration.

The camera sensor 2 may be, for example, a CCD sensor or a CMOS sensor. The camera sensor 2 captures an image of the target irradiation position and its periphery on the top surface of the mount 4 that are reflected in the mirrors 112 and 122 of the galvano scanners 11 and 12. As shown in FIG. 5, an optical module including a beam splitter 3 typified by a half mirror is arranged on an optical path between the laser oscillator and the mirror 122, according to this embodiment. Then, a part of luminous flux (including the grid pattern in the periphery of the target irradiation position on the top surface of the mount 4 and the light spot of the laser beam L) that is guided from the mount 4 side via the condensing lens 13 and the mirrors 112 and 122 is separated by the beam splitter 3, and inputted via an imaging lens 7 into the camera sensor 2, so as to image the luminous flux. A transmission plate 6 that is provided between the beam splitter 3 and the mirror 122 and transmitting the beam L is an optical path cancellation window to offset the displacement in the optical axis due to refraction of the laser beam L passing through the beam splitter 3.

The beam splitter 3 and the window 6 that pair up with each other need to be removed from the optical path at the time of the laser processing. For this purpose, it is preferable to unitize the beam splitter 3 and the window 6 and to provide a driving device to move the unit automatically or manually, so that the driving device performs advancing and retracting movement to insert the unit onto the optical path between the laser oscillator and the mirror 122 at the time of the calibration, and to retract the unit from the optical path at the time of the laser processing.

Figure 7:
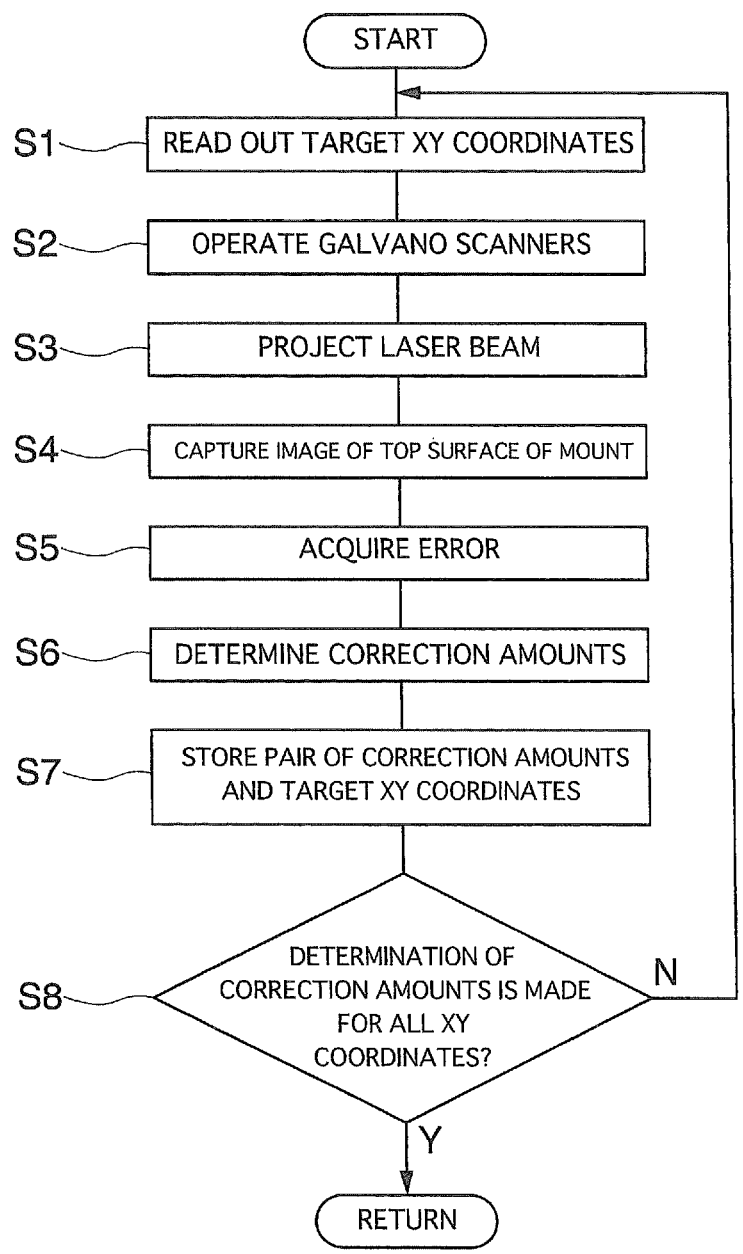
FIG. 7 is a flowchart showing procedural steps executed by the laser processing machine at the time of the error calibration.

The irradiation position of the laser beam L is calibrated before the laser processing operation. Procedural steps of the calibration processing executed by the control device 5 are shown in a flowchart in FIG. 7. The control device 5 reads out the coordinates of the target irradiation position included in the stored position data for calibration (step S1), and controls the mirrors 112 and 122 of the galvano scanners 11 and 12 so as to position the optical axis of the laser beam L at the read-out coordinates (step S2).

After that, the laser is oscillated from the laser oscillator to irradiate the top surface of the mount 4 with the laser beam L (step S3), and the camera sensor 2 captures an image of the target irradiation position and its periphery on the top surface of the mount 4 and the light spot (that is, reflected light) of the laser beam L on the surface (step S4). In the steps S3 and S4, the grid pattern in the periphery of the target irradiation position and the light spot of the laser beam L may be photographed together to obtain one image, or the photographing may be performed twice with a time interval to obtain two images, that is, the grid pattern in the periphery of the target irradiation position may be photographed first before irradiating the laser, and then irradiating the laser (without moving the mirrors 112 and 122) and the light spot appearing on the top surface of the mount 4 may be photographed.

Next, from the photographed one image or two images, the error between the XY coordinates, at which the laser beam L is actually detected via the beam detection sensor 2, and the target XY coordinates is acquired (step S5). As shown in FIG. 6, the image of the grid pattern 41 attached on the top surface of the mount 4, together with the light spot showing the actual irradiation point of the laser beam L on the top surface of the mount 4, is captured according to this embodiment. As the grid pattern 41 is a reference for the XY coordinates on the top surface of the mount 4, it is possible to calculate the position coordinate ($x_L$, $y_L$) of the light spot L by carrying out a computation to determine a distance in the image between the light spot L in the image and the grid pattern 41 in the periphery of the light spot L (or close to the light spot L). A discrepancy between the calculated coordinates ($x_L$, $y_L$) of the light spot L and the coordinates of the target irradiation position T ($x_T$, $y_T$) is the errors ($\Delta x$, $\Delta y$) to be acquired in the step S5.

Based on the acquired errors, the correction amounts are then determined (step S6), and a pair of the determined correction amounts and the target XY coordinates is stored (step S7). The control device 5 repeats the above-described steps S1 to S7 until the correction amounts of all the XY coordinates included in the position data for calibration are determined (step S8).

Figure 8:
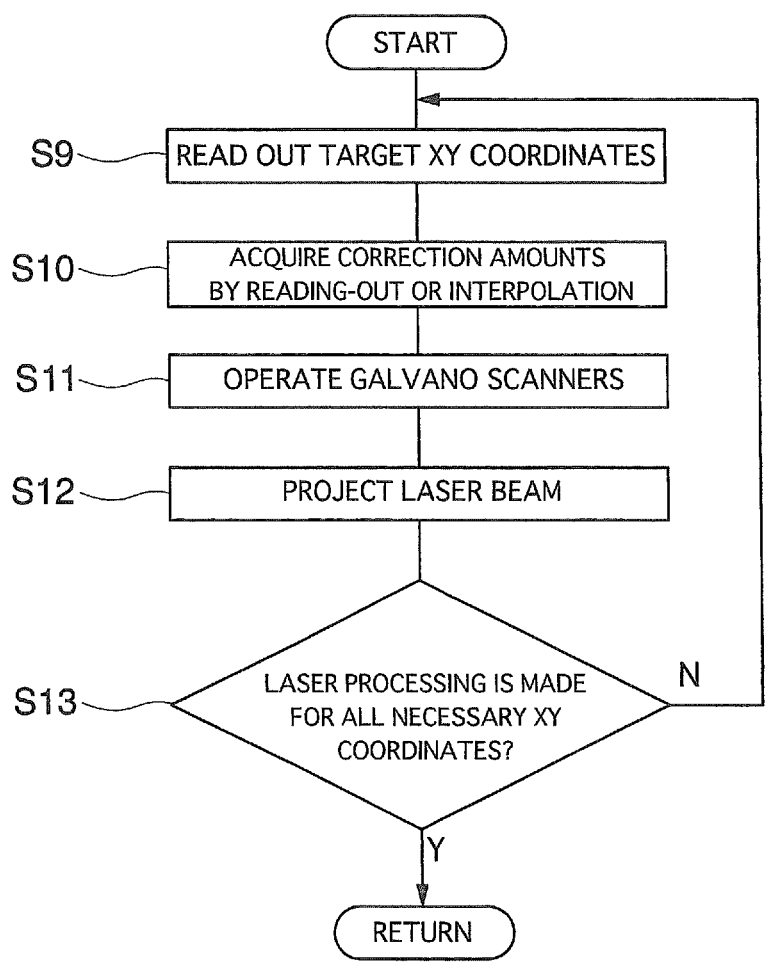
FIG. 8 is a flowchart showing procedural steps executed by the laser processing machine at the time of processing operation.

At the time of the laser processing operation, the workpiece is arranged on the mount 4 and the XY stage is controlled to return the mount 4 to its starting position. Procedural steps executed by the control device 5 at the time of the processing are shown in a flowchart in FIG. 8. The control device 5 reads out the XY coordinates defined by the stored position data for processing (step S9), and reads out or acquires by interpolation the correction amounts to be instructed to the galvano scanners 11 and 12 in order to irradiate the target XY coordinates with the laser beam L (step S10). Next, the control signal corresponding to the coordinates obtained by adding the correction amounts to the target XY coordinates is inputted in the galvano scanners 11 and 12 to control the galvano scanners 11 and 12 (step S11). Then, the laser beam L is projected (step S12). The control device 5 repeats the above-described steps S9 to S12 until the laser processing is applied to the required XY coordinates that are defined by the position data for processing (step S13).

According to this embodiment, the laser processing machine to apply the processing by irradiating the workpiece with the laser beam L includes the mirrors 112 and 122 to reflect the laser beam L oscillated from the laser oscillator to the predetermined surface (the top surface of the mount 4) on which the workpiece is arranged, the optical axis operating mechanisms 111 and 121 to position the optical axis of the laser beam L at the desired target irradiation position in the predetermined surface by changing the directions of the mirrors 112 and 122, the camera sensor 2 to capture the image of the target irradiation position and its periphery in the predetermined surface reflected in the mirrors 112 and 122, and the error calibration mechanism 5 to detect the error between the target irradiation position instructed to the optical axis operating mechanisms 111 and 121 and the actual position of the optical axis of the laser beam L in the predetermined surface, by referring to the image captured by the camera sensor 2. The correction amount to be instructed to the optical axis operating mechanisms 111 and 121 can be determined based on the error in order to irradiate the target irradiation position with the laser beam L during the processing.

Further, according to this embodiment, the laser processing machine to apply the processing by irradiating the workpiece with the laser beam L includes the mirrors 112 and 122 to reflect the laser beam L oscillated from the laser oscillator to the predetermined surface on which the workpiece is arranged, the optical axis operating mechanisms 111 and 121 to position the optical axis of the laser beam L at the desired target irradiation position in the predetermined surface by changing the directions of the mirrors 112 and 122, the camera sensor 2 to capture the image of the target irradiation position and its periphery in the predetermined surface and the light spot of the laser beam L projected on the predetermined surface, and the error calibration mechanism 5 to detect the error between the target irradiation position instructed to the optical axis operating mechanisms 111 and 121 and the actual position of the optical axis of the laser beam L in the predetermined surface by referring to the image captured by the camera sensor 2. The correction amount to be instructed to the optical axis operating mechanisms 111 and 121 can be determined based on the error in order to irradiate the target irradiation position with the laser beam during the processing.

As the irradiation position of the beam L and its error can be directly measured by the camera sensor 2 according to this embodiment, it is possible to calibrate the irradiation position easily without examining the pattern formed on the test piece by using the microscope, which is troublesome and takes time and effort. Moreover, it is not necessary to provide the microscope with high precision at the workplace.

While the beam splitter 3 is arranged on the optical path between the laser oscillator and the mirror 122, the laser beam L oscillated from the laser oscillator is transmitted through the beam splitter 3 and directed to the predetermined surface via the mirrors 122 and 112, and the camera sensor 2 captures the image of the target irradiation position and its periphery in the predetermined surface, together with the light spot of the laser beam L projected on the predetermined surface, via the mirror 122 and the beam splitter 3. Thus, the camera sensor 2 is kept immovable no matter how the target irradiation position of the laser beam L, that is, the angles of the mirrors 112 and 122 are changed. This realizes the stable calibration over a wide region in the predetermined surface.

The camera sensor 2 captures the image of the grid pattern provided on the predetermined surface and indicating the position coordinates of the respective positions on the predetermined surface, and the error calibration mechanism 5 detects the error with reference to the grid pattern appeared in the captured image. Therefore, it is possible to detect the coordinates where the beam L is actually projected in the predetermined surface with high accuracy, and hence the detailed and accurate calibration can be realized.

The error calibration mechanism 5 includes the irradiation position instruction unit 51 to give the instruction to the optical axis operating mechanisms 111 and 121 so as to position the optical axis of the laser beam L at the target irradiation position in the predetermined surface, the error detection unit 54 to calculate the error between the target irradiation position and the actual position of the optical axis of the laser beam L in the predetermined surface by referring to the image captured by the camera sensor 2, and the correction amount storage unit 55 to determine and store the correction amount to be instructed to the optical axis operating mechanisms 111 and 121 based on the error calculated in the error detection unit 54 in order to irradiate the target irradiation position during the processing. Thus, it is possible to perform the calibration automatically, without receiving an input, in a short period of time.

It should be noted that the present invention is not limited to the embodiment described in detail as above. According to the above-described embodiment, the laser beam L is projected at the time of the calibration, and the camera sensor 2 captures the image of its light spot and the grid pattern 41 in the periphery thereof. Meanwhile, when it is assured that the irradiation position of the laser beam L (coordinates of a pixel in the image) is permanently constant in the captured image (that is, a field of view of the camera sensor 2) irrespective of the angles of the mirrors 112 and 122, in other words, when a pixel at a specific position in the captured image can be regarded as the position where the laser beam L is projected at all times, it is possible to detect the error between the target irradiation position and the actual irradiation position, without the irradiation of the laser beam L, from a distance between a pixel of the target irradiation position that is obtained based on the grid pattern 41 and a pixel corresponding to the irradiation position of the laser beam L. This means that the irradiation of the laser beam L and capturing the image of the light spot are not necessarily required at the time of the calibration.

According to the above-described embodiment, the image of the target irradiation position and its periphery reflected in the mirror 122 is captured using the beam splitter 3 and the window 6, but the camera sensor 2 itself may perform the advancing and retracting movement by a driving device to cut into the optical path, without using the beam splitter 3 and the like. In this case, the camera sensor 2 is inserted onto the optical path between the laser oscillator and the mirror 122 at the time of the calibration, and the camera sensor 2 is retracted from the optical path at the time of the laser processing.

Alternatively, the image of the target irradiation position and its periphery on the top surface of the mount 4 may be captured directly without using the mirror 122.

Regarding to the concrete structures of the respective components, various modifications are possible without departing from the scope and spirit of this invention.

INDUSTRIAL APPLICABILITY

The present invention may be used as a processing machine that applies processing by irradiating a freely-selected position of a workpiece with a laser beam.

REFERENCE SIGNS LIST

0 laser processing machine
1 laser irradiation device
111, 121 optical axis operating mechanisms
112, 122 mirrors
2 camera sensor
3 beam splitter
4 predetermined surface
5 error calibration mechanism
L laser beam

The invention claimed is:

1. A laser processing machine to apply processing by irradiating a workpiece with a laser beam, the laser processing machine comprising:
a mirror to reflect the laser beam oscillated from a laser oscillator to a predetermined surface on which the workpiece is arranged;
an optical axis operating mechanism to position an optical axis of the laser beam at a desired target irradiation position in the predetermined surface by changing a direction of the mirror;
a camera sensor to capture an image of the target irradiation position and its periphery in the predetermined surface reflected in the mirror; and
an error calibration mechanism to detect an error between the target irradiation position instructed to the optical axis operating mechanism and an actual position of the optical axis of the laser beam in the predetermined surface, by referring to the image captured by the camera sensor,
wherein a correction amount to be instructed to the optical axis operating mechanism can be determined based on the error in order to irradiate the target irradiation position with the laser beam during processing,
wherein a grid pattern in the periphery of the target irradiation position and a light spot of the laser beam are photographed together to obtain one image by the camera sensor,
wherein the mirror includes a component of a galvano scanner,
wherein the grid pattern provided on the predetermined surface is a reference or XY coordinates on the predetermined surface,
wherein the camera sensor photographs the grid pattern in the periphery of the target irradiation position on the predetermined surface and the light spot of the laser beam on the predetermined surface together to obtain one image, and
wherein the error calibration mechanism calculates the position coordinate $(x_L, y_L)$ of the light spot of the laser beam on the predetermined surface by carrying out a computation to determine a distance in the image between the light spot and the grid pattern in a periphery of the light spot, and calculates errors $(\Delta x, \Delta y)$ between the calculated coordinates $(x_L, y_L)$ of the light spot and coordinates of the target irradiation position $(x_T, y_T)$.

2. A laser processing machine to apply processing by irradiating a workpiece with a laser beam, the laser processing machine comprising:
a mirror to reflect the laser beam oscillated from a laser oscillator to a predetermined surface on which the workpiece is arranged;
an optical axis operating mechanism to position an optical axis of the laser beam at a desired target irradiation position in the predetermined surface by changing a direction of the mirror;
a camera sensor to capture an image of the target irradiation position and its periphery in the predetermined surface, and a light spot of the laser beam on the predetermined surface; and
an error calibration mechanism to detect an error between the target irradiation position instructed to the optical axis operating mechanism and an actual position of the optical axis of the laser beam in the predetermined surface, by referring to the image captured by the camera sensor,
wherein a correction amount to be instructed to the optical axis operating mechanism can be determined based on the error in order to irradiate the target irradiation position with the laser beam during processing,
wherein a grid pattern in the periphery of the target irradiation position and the light spot of the laser beam are photographed together to obtain one image by the camera sensor,
wherein the mirror includes a component of a galvano scanner,
wherein the grid pattern provided on the predetermined surface is a reference or XY coordinates on the predetermined surface,
wherein the camera sensor photographs the grid pattern in the periphery of the target irradiation position on the predetermined surface and the light spot of the laser beam on the predetermined surface together to obtain one image, and
wherein the error calibration mechanism calculates the position coordinate $(x_L, y_L)$ of the light spot of the laser beam on the predetermined surface by carrying out a computation to determine a distance in the image between the light spot and the grid pattern in a periphery of the light spot, and calculates errors $(\Delta x, \Delta y)$ between the calculated coordinates $(x_L, y_L)$ of the light spot and coordinates of the target irradiation position $(x_T, y_T)$.

3. The laser processing machine according to claim 1, further comprising
a beam splitter arranged on an optical path between the laser oscillator and the mirror,
wherein the camera sensor captures the image of the target irradiation position and its periphery in the predetermined surface via the mirror and the beam splitter.

4. The laser processing machine according to claim 1, wherein the camera sensor captures an image of the grid pattern provided on the predetermined surface and indicating position coordinates of respective positions in the predetermined surface, and
wherein the error calibration mechanism detects the error with reference to the grid pattern appeared in the captured image.

5. The laser processing machine according to claim 1, wherein the error calibration mechanism comprises:
an irradiation position instruction unit to give an instruction to the optical axis operating mechanism so as to position the optical axis of the laser beam at the target irradiation position in the predetermined surface;
an error detection unit to calculate the error between the target irradiation position and the actual position of the optical axis of the laser beam in the predetermined surface by referring to the image captured by the camera sensor; and
a correction amount storage unit to determine and store the correction amount to be instructed to the optical axis operating mechanism based on the error calculated in the error detection unit in order to irradiate the target irradiation position during processing.

6. The laser processing machine according to claim 2, further comprising a beam splitter arranged on an optical path between the laser oscillator and the mirror,
wherein the camera sensor captures the image of the target irradiation position and its periphery in the predetermined surface via the mirror and the beam splitter.

7. The laser processing machine according to claim 2, wherein the camera sensor captures an image of the grid pattern provided on the predetermined surface and indicating position coordinates of respective positions in the predetermined surface, and
wherein the error calibration mechanism detects the error with reference to the grid pattern appeared in the captured image.

8. The laser processing machine according to claim 3, wherein the camera sensor captures an image of the grid pattern provided on the predetermined surface and indicating position coordinates of respective positions in the predetermined surface, and
wherein the error calibration mechanism detects the error with reference to the grid pattern appeared in the captured image.

9. The laser processing machine according to claim 6, wherein the camera sensor captures an image of the grid pattern provided on the predetermined surface and indicating position coordinates of respective positions in the predetermined surface, and
wherein the error calibration mechanism detects the error with reference to the grid pattern appeared in the captured image.

10. The laser processing machine according to claim 2, wherein the error calibration mechanism comprises:
an irradiation position instruction unit to give an instruction to the optical axis operating mechanism so as to position the optical axis of the laser beam at the target irradiation position in the predetermined surface;
an error detection unit to calculate the error between the target irradiation position and the actual position of the optical axis of the laser beam in the predetermined surface by referring to the image captured by the camera sensor; and
a correction amount storage unit to determine and store the correction amount to be instructed to the optical axis operating mechanism based on the error calculated in the error detection unit in order to irradiate the target irradiation position during processing.

11. The laser processing machine according to claim 3, wherein the error calibration mechanism comprises:
an irradiation position instruction unit to give an instruction to the optical axis operating mechanism so as to position the optical axis of the laser beam at the target irradiation position in the predetermined surface;
an error detection unit to calculate the error between the target irradiation position and the actual position of the optical axis of the laser beam in the predetermined surface by referring to the image captured by the camera sensor; and
a correction amount storage unit to determine and store the correction amount to be instructed to the optical axis operating mechanism based on the error calculated in the error detection unit in order to irradiate the target irradiation position during processing.

12. The laser processing machine according to claim 4, wherein the error calibration mechanism comprises:
an irradiation position instruction unit to give an instruction to the optical axis operating mechanism so as to position the optical axis of the laser beam at the target irradiation position in the predetermined surface;
an error detection unit to calculate the error between the target irradiation position and the actual position of the optical axis of the laser beam in the predetermined surface by referring to the image captured by the camera sensor; and
a correction amount storage unit to determine and store the correction amount to be instructed to the optical axis operating mechanism based on the error calculated in the error detection unit in order to irradiate the target irradiation position during processing.

13. The laser processing machine according to claim 6, wherein the error calibration mechanism comprises:
an irradiation position instruction unit to give an instruction to the optical axis operating mechanism so as to position the optical axis of the laser beam at the target irradiation position in the predetermined surface;
an error detection unit to calculate the error between the target irradiation position and the actual position of the optical axis of the laser beam in the predetermined surface by referring to the image captured by the camera sensor; and
a correction amount storage unit to determine and store the correction amount to be instructed to the optical axis operating mechanism based on the error calculated in the error detection unit in order to irradiate the target irradiation position during processing.

14. The laser processing machine according to claim 7, wherein the error calibration mechanism comprises:
an irradiation position instruction unit to give an instruction to the optical axis operating mechanism so as to position the optical axis of the laser beam at the target irradiation position in the predetermined surface;
an error detection unit to calculate the error between the target irradiation position and the actual position of the optical axis of the laser beam in the predetermined surface by referring to the image captured by the camera sensor; and
a correction amount storage unit to determine and store the correction amount to be instructed to the optical axis operating mechanism based on the error calculated in the error detection unit in order to irradiate the target irradiation position during processing.

15. The laser processing machine according to claim 8, wherein the error calibration mechanism comprises:
- an irradiation position instruction unit to give an instruction to the optical axis operating mechanism so as to position the optical axis of the laser beam at the target irradiation position in the predetermined surface;
- an error detection unit to calculate the error between the target irradiation position and the actual position of the optical axis of the laser beam in the predetermined surface by referring to the image captured by the camera sensor; and
- a correction amount storage unit to determine and store the correction amount to be instructed to the optical axis operating mechanism based on the error calculated in the error detection unit in order to irradiate the target irradiation position during processing.

16. The laser processing machine according to claim 9, wherein the error calibration mechanism comprises:
- an irradiation position instruction unit to give an instruction to the optical axis operating mechanism so as to position the optical axis of the laser beam at the target irradiation position in the predetermined surface;
- an error detection unit to calculate the error between the target irradiation position and the actual position of the optical axis of the laser beam in the predetermined surface by referring to the image captured by the camera sensor; and
- a correction amount storage unit to determine and store the correction amount to be instructed to the optical axis operating mechanism based on the error calculated in the error detection unit in order to irradiate the target irradiation position during processing.

17. The laser processing machine according to claim 1, wherein, from the photographed one image, the error calibration mechanism is configured to calculate an error between coordinates at which the laser beam is actually detected and target coordinates.

18. The laser processing machine according to claim 17, wherein the error calibration mechanism is further configured to calculate a position coordinate ($x_L$, $y_L$) of the light spot by carrying out a computation to determine a distance in the image between the light spot in the image and the grid pattern in the periphery of the light spot.

19. The laser processing machine according to claim 17, wherein the error calibration mechanism is further configured to calculate a discrepancy between the calculated coordinate of the light spot and the coordinates of the target irradiation position.

* * * * *